June 13, 1961 R. J. KUTZLER 2,988,306
AIRCRAFT SURFACE CONTROL
Filed Oct. 17, 1955 4 Sheets-Sheet 3

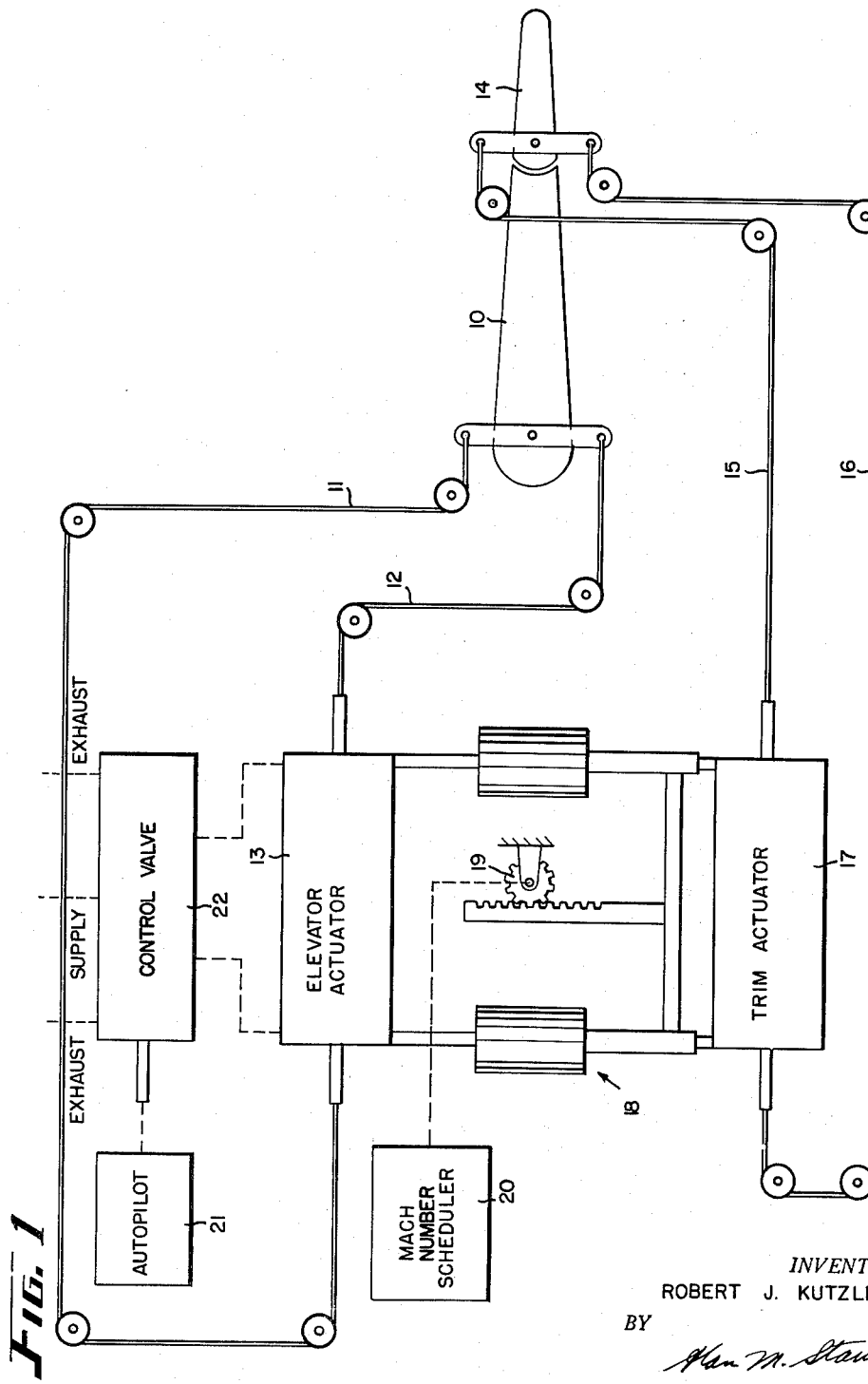

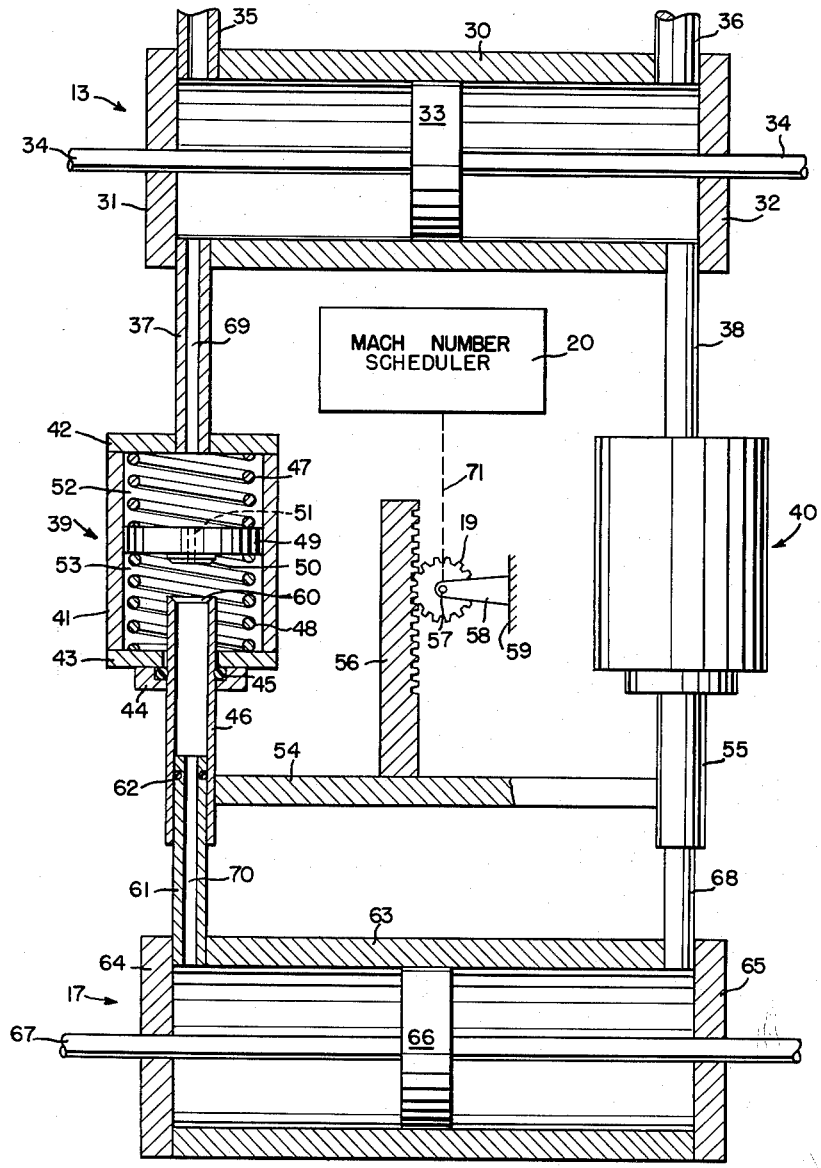

INVENTOR.
ROBERT J. KUTZLER
BY
Alan M. Stanley
ATTORNEY

June 13, 1961  R. J. KUTZLER  2,988,306
AIRCRAFT SURFACE CONTROL
Filed Oct. 17, 1955  4 Sheets-Sheet 4

INVENTOR.
ROBERT J. KUTZLER
BY
ATTORNEY

United States Patent Office 2,988,306
Patented June 13, 1961

2,988,306
AIRCRAFT SURFACE CONTROL
Robert J. Kutzler, St. Louis Park, Minn., assignor to Minneapolis-Honeywell Regulator Company, Minneapolis, Minn., a corporation of Delaware
Filed Oct. 17, 1955, Ser. No. 540,820
16 Claims. (Cl. 244—78)

This invention relates to the control of an aerial foil, such as a trim surface of an elevator of an aircraft by means of fluid pressure, wherein the extent of movement of the trim surface at a relatively rapid rate is limited and determined as a function of airspeed by a control device.

In aircraft, hydraulic elevator actuators and trim actuators have previously been connected in parallel, the piping connections between them being either unobstructed or having a restriction therein. The use of an unrestricted connection between the two sets of actuators allows such a rapid rate of response of the trim actuator to the hydraulic pressure signal that should the hydraulic pressure signal to the actuators be the result of an error caused by faulty autopilot operation, the pilot of the aircraft would have little or no time to uncouple or disconnect the autopilot before the full error were translated to the aircraft surfaces. Thus, the pilot would be forced to manually reposition the surfaces to the desired position and over the full range of the error. Further, should the trim surface be allowed to move rapidly over its entire travel, as it would do if placed in unobstructed parallel operation with the elevator actuator, it would men that the trim surface actuator could rapidly remove the air loads from the elevator permitting that member to move rapidly and thus allowing the aircraft to go through maneuvers that would possibly tax its rigidity and stability.

By using a restriction between the two sets of actuators, the rapid speed of response can be diminished, but to the detriment of the maneuverability of the aircraft, as the trim surface movement will be held up until fluid can get past the restriction to act on the trim actuator, thus the elevator movement will be held up until the elevator actuator can overcome the load on the elevator which has been diminished by the trim surface movement.

The present existing devices make no provision for hydraulically limiting the extent of rapid or unrestrained trim movement, nor do they limit the extent of rapid movement as a function of airspeed which is essential at high speeds due to the large increment of load placed on a surface for a relatively small change in surface position.

The present invention solves the above problem by providing a device that allows relatively rapid trim surface movement followed by subsequent slow trim surface movement, and schedules the extent of this rapid movement as a function of airspeed or Mach number.

It is an object of this invention therefore to provide a control that limits the initial rate of movement of the trim surface as a function of airspeed.

Another object of this invention is to provide a control that will change the rate of movement of the trim surface dependent upon airspeed.

It is a further object of this invention, to provide a device that is simple in design and circuitry for controlling change of rate of movement as a function of a condition.

These and other objects will become apparent from a reading of the following description in conjunction with the drawings in which:

FIGURE 1 is a schematic illustration of the invention in an aircraft system;

FIGURE 2 is a detailed schematic showing of the invention;

Figure 4:
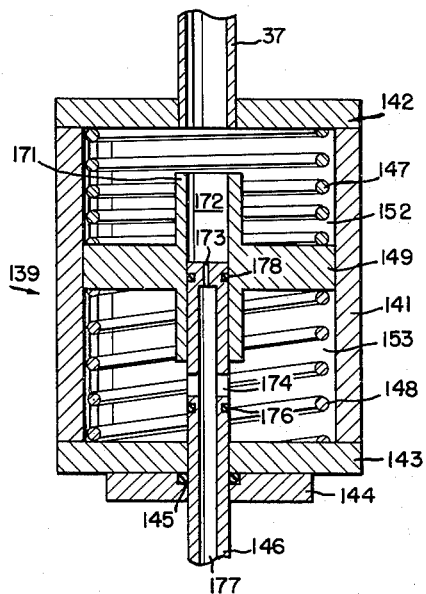
FIGURE 4 is a view showing a modification of a portion of FIGURE 2.

FIGURE 1 shows an elevator 10 connected by cables 11 and 12 to an elevator actuator 13, and a trim surface 14 connected by cables 15 and 16 to a trim actuator 17. Interposed between the elevator actuator 13 and the trim actuator 17 is a control device 18 for changing rate of movement. Mechanically connected to the control device 18 is a pinion 19, which is controlled by a Mach (the ratio of the speed of a body to the speed of sound in the surrounding atmosphere) number scheduler 20. The elevator actuator 13 is controlled by an autopilot 21 acting through a control valve 22.

In FIGURE 2, the elevator actuator 13 comprises a cylinder 30 sealed at either end by cylinder heads 31 and 32. Contained within the cylinder 30 is a piston 33, and attached thereto and extending through and beyond the cylinder head and connected to a controlled device, not shown, a piston rod 34. Fluid connectors 35 and 36 serve as supply and exhaust channels from and to the control valve 22, and, likewise, fluid connectors 37 and 38 serve as supply and exhaust channels to and from the control chambers 39 and 40. Control chamber 39, which is constructed in the same manner as control chamber 40, has a cylinder 41, an upper cylinder head 42 sealed to the cylinder containing an opening for the fluid connector 37 which is sealed in place, and a lower cylinder head 43 containing an opening that allows a movable fluid connector 46 to slide therethrough. Cap 44, containing a packing ring 45, is attached to the lower cylinder head to prevent leakage past the fluid connector 46. Within the cylinder 41, springs 47 and 48 bias a piston 49 to a fixed position. The piston 49 has a valve portion 50 and contains an orifice 51 that connects the upper cylinder chamber 52 with the lower cylinder chamber 53 when in the position shown in FIGURE 2, and when the piston is depressed the valve member 50 mates with the valve seat 60 formed in fluid connector 46.

Attached to the movable fluid connector 46, at a point near its lower end, is a bar 54, which is also connected to a fluid connector 55 situated in chamber 40 in the same way fluid connector 46 is situated in chamber 39. A rack 56 extends perpendicularly from the bar 54, to which it is attached, and meshes with the pinion 19 which is keyed on a shaft 57. The shaft 57 is journaled in the bracket 58 which is attached to a firm member 59. By means of connection 71 Mach number scheduler 20 rotates shaft 57 and thereby pinion 19, positioning the rack 56, bar 54, and movable fluid connector 46. Within movable fluid connector 46 is a fluid connector 61 provided with a packing ring 62 at its upper end, its lower end being fixed in a cylinder 63 of the trim actuator 17. Fluid connector 68 is similarly situated. The cylinder 63 is sealed at each end by cylinder heads 64 and 65, and within the cylinder is a piston 66 to which is attached piston rod 67. Rod 67 extends from either side of piston 66 through and beyond the cylinder heads and connects with a controlled area not shown. Interior diameters 69 and 70 of fluid connector 37 and fluid connector 61, respectively, are of larger diameter than orifice 51 of piston 49.

The control device shown in FIGURE 1 and FIGURE 2 operates in the following manner: Assume a set Mach number and further assume the condition of the device is as shown and that the autopilot 21 calls for upward elevator movement. The control valve 22 is moved to allow fluid under pressure to enter the left chamber of the elevator actuator 13 while connecting the right chamber of the elevator actuator 13 to the exhaust, causing the piston 33 to move to the right thereby causing upward elevator movement. At the same time, fluid passes through passage 69 of fluid connector 37 causing a pressure differential to be built up between the upper cylinder chamber 52 and the lower cylinder chamber 53. This is because the right cylinder chamber of the trim actuator 17 is also connected to the exhaust by means of fluid connectors 68, 55, and 38, and control chamber 40. The pressure differential in the control chamber 40 forces the piston down against the action of the spring 48, thereby forcing fluid out of the lower cylinder chamber 53 and into the left chamber of the trim actuator 17 at a relatively rapid rate until the valve member 50 attached to the piston 49 seats on the valve seat 60, whereupon the fluid flow to the left chamber of the trim actuator is reduced, as flow is limited by the orifice 51 in the piston 49. Thus it can be seen, flow to the trim actuator has an initial rapid rate and a reduced subsequent rate of movement, which continues until the pressure differential between the elevator actuator and the trim actuator has dissipated, or until the load on the elevator is equal to the load on the trim.

The rapid flow of fluid or the rapid movement of the trim actuator is controlled by the size of the control chambers 39 and 40 and the initial relative distance between the piston 49 and the valve seat 60. This distance is governed by the Mach number scheduler 20 which moves the pinion 19 and thus the rack 56, bar 54, and movable fluid connector 46 as a function of Mach number. Thus, as the speed increases, the Mach number scheduler 20 positions the valve seat 60 through the above mentioned components closer to the steady state position of the piston 49, thereby allowing less fluid to be passed rapidly to the trim actuator before the valve member 50 is seated on the valve seat 60 when a new elevator position is called for.

Figure 3:
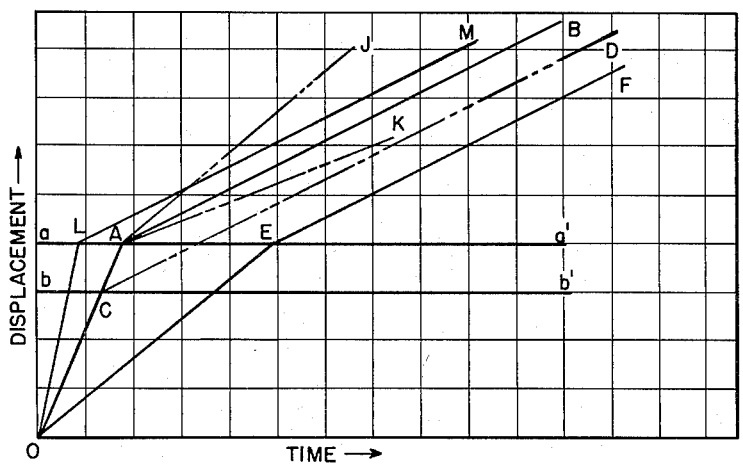
FIGURE 3 is a graph indicating "time vs. displacement" for a system containing the invention.

The results of the control device 18 can be presented graphically, as shown in FIGURE 3, with coordinates of "time" and "displacement." Thus for a Mach number of "X," a certain distance between the steady state position of the piston 49 and the valve seat 60 is obtained. Upon a demand for a new elevator position, the trim actuator piston 66 and piston rod 67 will be displaced at a rapid rate OA an amount corresponding to displacement Oa of piston 49 to seat 60, as shown on the graph, after which the valve member 50 will be seated on the valve seat 60 and have a constant displacement along aa', and further displacement of piston 66 will be at the rate AB, as the fluid is passed through the orifice 51 only. For a Mach number "X" plus "Y," the distance between the steady state position of the piston 49 and the valve seat 60 is reduced to Ob, and the amount of rapid travel of the trim actuator piston 66 and piston rod 67 is thereby reduced accordingly during displacement of piston 49 to seat 60 corresponding to Ob at a rate OC, after which movement caused by flow to the orifice 51 is at the rate shown by line CD since piston 49 has a constant displacement along bb'. Of course, it is to be understood that the duration of AB and CD movement rates are limited by the demand for elevator movement and a continuation of a pressure differential between the elevator actuator and the trim actuator.

By controlling the relative size of the orifice 51 and the passages 69 and 70, various rates of movement can be obtained. Thus, if the passages 69 and 70 are kept constant and the orifice 51 increased in diameter, the ratio between initial rate of movement and subsequent rate of movement can be reduced. This is represented on the graph by the rates OA and AJ. Contrarywise, if the passages 69 and 70 are kept constant and the orifice 51 reduced, the resulting subsequent rate of movement will be less. This is representetd by rates OA and AK. Similarly the orifice 51 can be kept constant and the passages 69, 70 increased or reduced in diameter. Under these conditions rates of movement OE and EF would result for decreased passage diameter and rates of movement OL and LM for increased passage diameter.

In FIGURE 4, a modification of the control chamber and the movable fluid connector is shown. Cylinder 141 is sealed at either end by cylinder heads 142 and 143 and has disposed within it a piston 149, biased by springs 147 and 148 under steady state condition to a fixed position, which divides the cylinder into an upper cylinder chamber 152 and a lower cylinder chamber 153. Attached to the cylinder head 143 is a cap 144 containing a packing seal 145 to prevent leakage past the movable fluid connector 146. The piston 149 at its central portion has a hub 171 with a bore 172 to permit sliding contact between it and a movable fluid connector 146. At the top end of movable fluid connector 146 an orifice 173 is provided, and another orifice 174, larger in size, is located at a position farther down the movable fluid connector 146. Sealing rings 178 and 176 are located in strategic positions to prevent leakage between the bore 172 of the piston 149 and the movable fluid connector 146, regardless of the relative position of the piston 149 and the movable fluid connector 146. As in FIGURE 2, the movable fluid connector is positioned as a function of Mach number by a Mach number scheduler, not shown.

Assuming steady state conditions, in which the forces acting throughout the system are in equilibrium, and that the device is in the position as shown, the embodiment of FIGURE 4 operates as follows: As pressure fluid from the control valve, not shown, enters the upper cylinder chamber 152 and acts on the piston 149, the piston is depressed to a lower position, thereby forcing fluid from the lower cylinder chamber 153 through orifice 174 and thence to the actuator, not shown, connected to the movable fluid connector 146. This condition continues until the orifice 174 is within the hub 171 and the sealing ring 176 provides a seal between the piston bore 172 and the movable fluid connector 146. When this occurs, fluid from upper chamber 152 flows through orifice 173 to the trim actuator, not shown, due to the differential pressure set up by valving fluid to one side of the actuator and exhausting from the other, as was explained in conjunction with FIGURE 2.

Again it is to be noted, that the sizes of the orifice 174, fluid passages 177, and control chamber 139 determine the extent of the rapid rate of movement of the trim actuator, and the diameter of orifice 173 determines the rate of the subsequent actuator movement.

Figure 5:
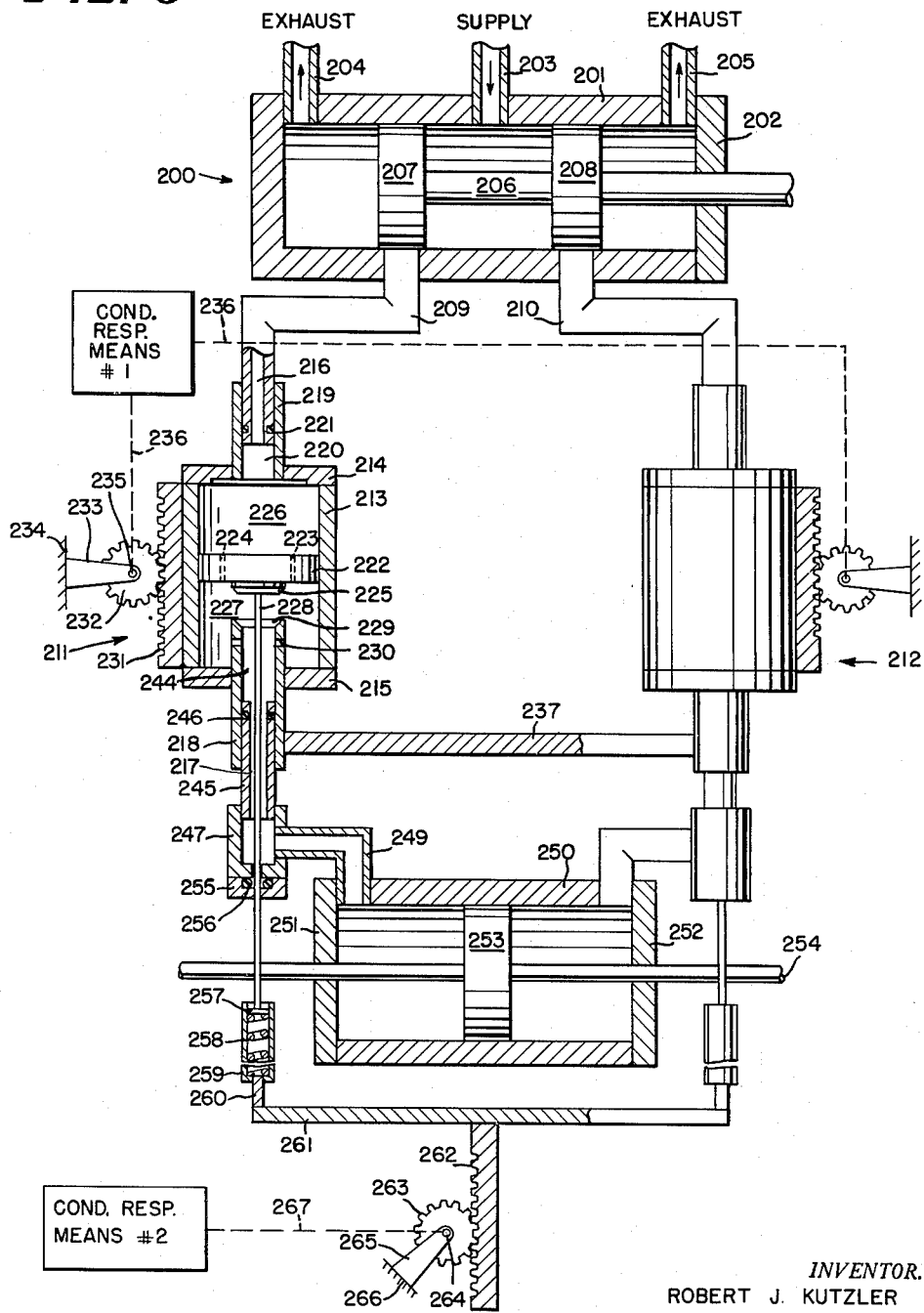
FIGURE 5 is a schematic view showing another modification of the invention.

FIGURE 5 is an embodiment of the invention as applied to a control element positioned as a function of a combination of condition responsive means and actuated directly by means of a control valve.

In the figure, the control valve 200 comprises a valve body 201 with an end plate 202 sealed thereto, and having a supply 203 and a pair of exhaust passages 204 and 205. The valve body 201 contains a spool valve 206 with land portions 207 and 208 which cover the port of the fluid connectors 209 and 210. Control chamber 211, similar to control chamber 212 in construction, consists of a cylinder portion 213, cylinder heads 214 and 215 sealed thereto. The upper cylinder head 214 has a pipe 219 sealed to it with a bore 220 to allow a sliding fit with the fluid connector 209, which has a sealing ring 221 near its lower extremity. Within the cylinder 213 is a piston 222, containing orifices 223 and 224 the combined area of which is less than that of the fluid passage 216, a valve portion 225, and having a piston rod 228 attached thereto, said piston dividing the cylinder 213 into an upper cylinder chamber 226 and a lower cylinder chamber 227. A pipe 218 is firmly connected to cylinder head 215 and has a valve seat 229 at its upper end and orifices 230, of a relatively small diameter, near its upper extremity. Fixedly mounted to the cylinder 213 is a rack 231, which meshes with a pinion 232 keyed to a shaft 235. The shaft is journaled in a bracket 233, which is fastened to a firm member 234. The shaft, and thereby the pinion, are rotated by a condition responsive element No. 1 by means of connector 236. As both control chambers 211 and 212 are controlled by the condition responsive element No. 1, their movement is synchronized. The pipe 218 has a bore 244 that allows sliding movement between it and a pipe 245. The pipe 245 has a sealing ring 246 near its upper extremity and has a fluid passage 217 which has an effective area equal to that of fluid connector 209 and is attached at its lower end to block 247. Fluid connector 249 is also firmly attached to block 247 and to actuator cylinder 250, said cylinder being sealed at either end by cylinder heads 251 and 252, and containing a piston 253, with a piston rod 254 attached thereto extending through the cylinder heads 251 and 252 and beyond and attached to a controlled area, not shown. The piston rod 228 extends downwardly from its attachment with piston 222 passing through pipe 218, pipe 245, block 247, a cap 255 which closes the lower end of block 247, and sealing ring 256 in cap 255, its lower extremity having an attached ring 257 suitably connected to the upper end of a spring 258, the lower end of which is suitably connected to the interior bottom portion of sleeve 259 which is attached to a bar 260. The bar 260 is connected to a second bar 261, which in turn is connected to a rack 262 that meshes with a pinion 263. The pinion is keyed to a shaft 264, which is journaled in bracket 265 attached to a fixed member 266. Condition responsive element No. 2 rotates the shaft 264 and thus the pinion 263 by means of a connector 267.

The operation of the device of FIGURE 5 is as follows: Assume the device is in the condition shown, and that a movement of the actuator to the right is desired. Spool valve 206 is moved to the left to allow fluid under pressure to pass into fluid connector 209 and to allow fluid from the fluid connector 210 to pass to exhaust. The fluid entering upper chamber 226 of the control chamber 211 creates enough force to overcome the bias of the spring 258 and thereby allow a downward movement of the piston 222. However, the spring bias is of such a scale that it is not overcome when condition responsive element No. 2 moves the rack 262 and bars 260 and 261 either upwardly or downwardly during steady state conditions. This downward movement of the piston 222 forces fluid from the lower cylinder chamber 227 through passage 244, orifice 230, pipe 245, block 247, and fluid connector 249 into the lefthand chamber of the actuator causing relatively rapid movement to the right of the actuator piston 253. This rapid movement of the actuator piston continues until the valve member 225 is seated on valve seat 229, thereafter a slower movement of the actuator ensues, as the fluid can pass through the actuator only through the orifices 223, 224 and 230. The slower movement of the actuator piston 253 continues until the pilot valve 206 closes out the supply of fluid under pressure to the fluid connector 209, or until the piston 253 seats on the cylinder head 252. It is of course apparent that the actuator can be moved to the left under the control of control chamber 212 in the same manner, by moving pilot valve 206 to the right. The distance between the valve member 225 and the valve seat 229, and thus the extent of rapid movement is determined by the relative movement of the piston 222 and the control chamber 213 which are under the control of condition responsive element No. 2 and condition responsive element No. 1 respectively.

Figure 6:
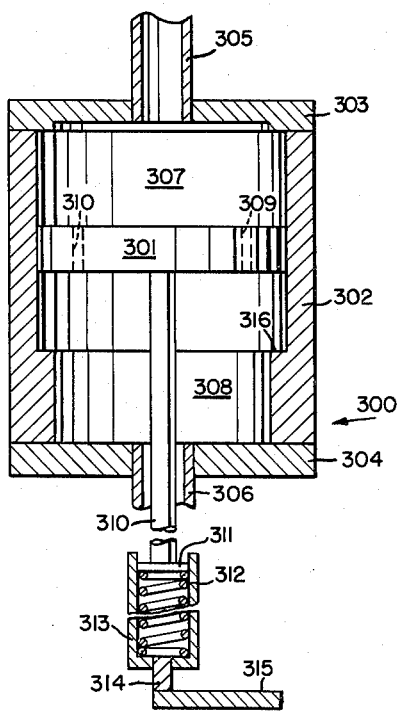
FIGURE 6 is a view showing modification of a portion of FIGURE 5.

The modification of FIGURE 6 is of a control chamber 300, wherein the position of the piston 301 is controlled in the same manner as that shown in FIGURE 5, that is, by means of a condition responsive element, rack and pinion positioning means, which are shown in FIGURE 5 but not shown in FIGURE 6. The control chamber 300 is comprised of a cylinder 302, upper cylinder head 303, lower cylinder head 304, sealed to the cylinder 302. Fluid connectors 305 and 306 serve as fluid passages to the upper cylinder chamber 307 and lower cylinder chamber 308 respectively, and are in communication with the control valve and actuator, both not shown, respectively. Orifices 309 and 310 are provided in the piston, their combined areas being less than that of the effective fluid passage area of fluid connector 306. Attached to the piston 301 is a piston rod 310 at whose lower end is attached a ring 311. Spring 312 is firmly attached to ring 311 and to the interior bottom portion of sleeve 313. Bars 314 and 315 provide the connection with the rack, pinion, condition responsive element, all not shown, and sleeve 313.

Operation of FIGURE 6 is as follows: As fluid under pressure from a control valve or other fluid pressure source, not shown, enters the upper chamber 307, it causes piston 301 to be moved downwardly, at a relatively rapid rate, overcoming the bias of spring 312, which is of such strength that it can position the piston 301 under steady state conditions, but is collapsed when the piston is moved downwardly due to fluid pressure from a pilot valve or other fluid pressure source. As the piston moves downwardly fluid from the lower cylinder chamber 308 is forced into the interior passage of fluid connector 306, and thence to the actuator, not shown. This rapid movement continues until the piston 301 engages a ledge 316 in the cylinder 302, whereupon fluid passes to the actuator from the upper cylinder chamber 307 through orifices 309 and 310, causing thereby, relatively slower movement. This relatively slower movement continues until the pressure differential between the upper cylinder chamber 307 and the lower cylinder chamber 308 is dissipated.

It is apparent that many other modifications of the present invention may be made without departing from the spirit of the invention. Therefore, the scope of the invention should be determined only by the appended claims.

I claim:

1. In a control mechanism for aircraft, a first hydraulic actuator for operating a main control surface having trim means thereon, a second hydraulic actuator for operating said trim means, means connecting said first and second hydraulic actuator and controlling the rate of movement of said second hydraulic actuator, said means comprising a condition responsive means, a chamber connected to said first hydraulic actuator, a valve consisting of a movable valve seat portion within said chamber connected to said second hydraulic actuator, the position of said movable valve seat portion being determined by said condition responsive means, and a movable valve piston within said chamber biased to a fixed position under a steady state condition, and a restricted orifice in said movable valve piston providing a passage between said first and second hydraulic actuators regardless of said valve condition.

2. In a control mechanism, a first actuator for operating a main control means having secondary control means thereon, a second actuator for operating said secondary control means, means connecting said first and second actuator and controlling the rate of movement of said second actuator, said means comprising a chamber connected to said first actuator, a valve consisting of a movable valve seat portion within said chamber connected to said second actuator, the position of said movable valve seat portion being determined by a condition responsive means, and a movable valve piston within said chamber biased to a fixed position under a steady state condition, and a restricted connection bypassing said valve and providing a passage between said first and second actuators regardless of said valve condition.

3. In a control mechanism, a pilot valve and hydraulic actuator, means connecting said pilot valve and said actuator and controlling the rate of movement of said actuator, said means comprising a chamber which is connected to said pilot valve, a second valve consisting of a movable valve seat portion within said chamber and having passage means connected to said actuator, the position of said movable valve seat portion being determined by a condition responsive means, and a movable valve piston within said chamber biased in a fixed position under a steady state condition and responsive to pilot valve movement, and a restricted connection bypassing said second valve and providing a passage between said pilot valve and said actuator regardless of said valve condition.

4. In a control device, control means, an actuator, means connecting said control means and actuator and controlling the rate of movement of said actuator, said means comprising a movable chamber connected to said control means, the position of said movable chamber being determined by a condition responsive means, a valve consisting of a valve seat portion within said movable chamber and having passage means connected to said actuator, a movable valve piston within said movable chamber biased to a fixed position under a steady state condition, and a restricted connection bypassing said valve and providing a passage between said control means actuator regardless of said valve condition.

5. In a control device, control means, an actuator, means connecting said control means and actuator and controlling the rate of movement of said actuator, said means comprising a chamber connected to said control means and actuator, said chamber containing a valve seat portion and a movable valve piston within said chamber which is reversibly positioned by a condition responsive means but which is limited in its movement by said valve seat, and a restricted orifice in said movable valve piston providing a passage between said control means and actuator regardless of the valve condition.

6. In control apparatus, a first member, a second member, said first member controlling the extent of movement of said second member, means connected between said first and second members and controlling the rate of movement of said second member, said means comprising a chamber, a valve member within said chamber consisting of a seat and a piston and having an adjustable closure distance therebetween, means connected to said valve member and operable to vary the adjustable closure distance, and a restricted connection bypassing said valve member.

7. In a control mechanism, a first member connected to a source of pressurized fluid, a second member, said first member controlling the flow of said fluid to said second member to thereby control the extent of movement of said second member, means connected between said first and second members and controlling the rate of said second member movement, said means comprising a chamber, a movable piston within said chamber biased to a fixed position under steady state condition and movable in response to first member movement, a movable stop, means operable to position said movable stop, said stop limiting the movement of said movable piston, and a restricted connection bypassing said movable piston.

8. In a control means, a first member, a second member, said first member controlling the extent of movement of said second member, means connecting said first and second members and controlling the rate of movement of said second member, said means comprising a valve member, and a restricted connection bypassing said valve member, the closing of said valve member being determined by first member movement over a predetermined closure distance, condition responsive means, and means operable to vary the closure distance of said valve member and arranged to be actuated by said condition responsive means.

9. In apparatus for regulating rate of movement, means connected to a controlling member and a controlled member, said means comprising a chamber containing a variably positioned stop, condition responsive means, means for varying said stop position, a movable piston within said chamber positioned by said condition responsive means subject to movement by said controlling member and limited in its movement by said stop, and a retricted connection bypassing said movable piston.

10. In apparatus for regulating rate of movement, condition responsive means, means connected to a controlling member and a controlled member, said means comprising a chamber, a valve including a valve element within said chamber which is positioned by said condition responsive means, a movable valve element within said chamber biased to a fixed position during steady state conditions and responsive to pressure from said controlling member but limited in said movement by closure of said valve, and a restricted connection bypassing said valve.

11. In a control mechanism, a first member, a second member, said first member controlling the extent of movement of said second member, means connected between said first and second member and controlling the rate of movement of said second member, said means comprising a valve member defining a passage through which flow may be regulated, said valve member having a first valve element biased to a fixed position under steady state conditions and movable in response to first member movement, a second valve element adjustable with respect to said first valve element, means operable to adjust said second valve element and thereby determine the extent of said first valve element movement, and a restricted connection bypassing said valve member.

12. In a control device, first and second hydraulic chambers each containing fluid means for transferring fluid from one of said hydraulic chambers to the other of said hydraulic chambers at a variable rate, said means comprising a conduit means connecting said hydraulic chambers, said conduit means including a conduit chamber, a piston dividing said conduit chamber and normally biased to a predetermined position, a first side of said piston being exposed to the pressure of the fluid in one of said hydraulic chambers, a second side of said piston being exposed to the pressure of the fluid in the other of said hydraulic chambers, said piston being movable in response to differential pressure between said first and second sides, stop means coacting with said piston for limiting the movement of said piston, condition responsive means for controlling the operation of said stop means, and restricted conduit means between said hydraulic chambers bypassing said piston.

13. In a control apparatus, first and second hydraulic devices each of which has a hydraulic chamber, fluid conduit means connecting said hydraulic chambers, said conduit means comprising a conduit chamber, a piston in said conduit chamber normally biased to a predetermined position and movable in response to differential pressure in said hydraulic chambers, restricted conduit means bypassing said piston and allowing restricted flow between said hydraulic chambers, and means associated with said conduit chamber for adjustably limiting the movement of said piston.

14. In a control apparatus, first and second hydraulic devices each having a hydraulic chamber, each of said chambers containing a fluid under variable pressure, conduit means connecting said chambers comprising a conduit chamber, a piston in said conduit chamber movable in response to the difference in pressure in said hydraulic chambers, stop means coacting with said piston for limiting the movement of said piston, condition responsive means for adjusting the position of operation of said stop means, and a restricted conduit means bypassing said piston to allow restricted flow of fluid between said chambers regardless of the position of said piston.

15. Control apparatus comprising: an actuator including a fluid filled tubular housing, an axially movable piston mounted in said housing, and an output ram carried by said piston; a fluid line connected to said actuator;

flow control means associated with said line for controlling the flow of fluid therein, said means including a second fluid-filled tubular housing mounted in said line, an axially movable second piston mounted in said housing and having a limited axial movement, means for biasing said piston to a predetermined axial position, and a restricted fluid connection means bypassing said second piston; condition responsive means for varying said second piston axial movement limits, and means connecting a source of pressurized hydraulic fluid to said line to thereby move said ram at a first rate during the second piston movement, and at a second rate thereafter determined by said restricted connection.

16. Control apparatus comprising: an actuator including a fluid filled tubular housing, an axially movable piston mounted in said housing so as to divide said housing into two chambers, and an output ram carried by said piston; a fluid line connected to each of said chambers, a pair of flow control means individually associated with said lines for controlling the flow of fluid therein, each said means including a second fluid-filled tubular housing mounted in said line, an axially movable second piston mounted in said second housing and having a limited axial movement, means for biasing said piston to a predetermined axial position, and a restricted fluid connection means bypassing said second piston; condition responsive means for varying said second piston axial movement limits; and means connecting a source of pressurized hydraulic fluid to one or the other of said lines to thereby reversibly move said ram at a first rate during second piston movement and at a second rate thereafter determined by said restricted connection means.

References Cited in the file of this patent

UNITED STATES PATENTS

| | | |
|---|---|---|
| 2,045,579 | Carlson | June 30, 1936 |
| 2,183,932 | Carlson | Dec. 19, 1939 |
| 2,220,920 | Stratton | Nov. 12, 1940 |
| 2,361,460 | Daugherty | Oct. 31, 1944 |
| 2,362,864 | Towler | Nov. 14, 1944 |
| 2,598,233 | Deardorff | May 27, 1952 |
| 2,807,238 | Pilch | Sept. 24, 1957 |